June 8, 1965 S. L. MILLER 3,188,475

MULTIPLE ZONE PHOTOELECTRIC DEVICE

Filed Nov. 24, 1961

2 Sheets-Sheet 1

SOLOMON L. MILLER
INVENTOR.

BY Christie, Parker & Hale
ATTORNEYS

MULTIPLE ZONE PHOTOELECTRIC DEVICE

Filed Nov. 24, 1961 2 Sheets-Sheet 2

SOLOMON L. MILLER
INVENTOR.

BY Christie, Parker & Hale
ATTORNEYS

United States Patent Office 3,188,475
Patented June 8, 1965

3,188,475
MULTIPLE ZONE PHOTOELECTRIC DEVICE
Solomon L. Miller, Sunnyvale, Calif., assignor, by mesne assignments, to Raytheon Company, Lexington, Mass., a corporation of Delaware
Filed Nov. 24, 1961, Ser. No. 154,791
3 Claims. (Cl. 250—211)

This invention relates to photoelectric devices which convert radiant energy, such as light, into electrical energy.

Some photoelectric devices are made from semiconductor bodies with p-n junctions located relatively close to one surface which is irradiated with energy, such as sunlight. The radiant energy produces electron-hole pairs, which are separated by the junction field at the p-n junctions to serve as an electrical power source.

One present use of photosensitive semiconductor diodes is to read information from punched tape. A typical punched tape includes nine columns of perforations which extend longitudinally along the tape in the direction in which the tape is moved. The perforations are formed, or omitted, in rows which extend perpendicular to the columns. In any given row, all or none of the positions in the columns may be perforated, or any combination of positions may be perforated. A row of photosensitive semi-conductor diodes are disposed in a row underneath the tape to sense which positions of the tape in a row are perforated and which are not. A light source is disposed over the tape so that as the tape moves over the row of diodes, selected diodes are illuminated to generate signals that indicate which positions in the row over the diodes are punched.

The presently available photovoltaic diode arrays can read only one row at a time. It is desirable to have an array of diodes which can simultaneously sense the perforations on the nine columns for from ten to fifteen rows of the punched tape. Such a system has not been considered feasible prior to this invention because the diodes usually have one common connection on a surface opposite from the tape, and a separate connection on the surface adjacent the tape for each diode. Because of the close spacing between the positions on a punched tape, and the consequent close spacing required of the diodes, the problem of contacting the front faces of the diodes in some 100 to 150 positions is considerable. Not only is the cost of such an array prohibitive, but the leads required for the various diodes would interfere with the illumination of the sensitive areas on the semiconductor body.

This invention provides an array of diodes which can easily be connected for sensing the punched condition of many rows of tape without requiring intricate wiring and without interfering with the illumination of each segment or island of semiconductor body that forms a respective diode.

Prior to this invention, it has always been thought that the photovoltaic diodes must be illuminated from the surface to which the diode junction is the closest. This arrangement, of course, is preferred when efficiency is of primary consideration. However, in reading information from a punched tape the objective is not efficiency in converting light, but economy in space and speed in reading the information. Because of this, some sacrifice can be made in sensitivity to obtain an array which reads many positions simultaneously. This invention achieves this result by providing a diode array which is illuminated on the surface with the region or zone common to all diodes. The isolated zones or islands of the individual diodes are on the opposite or back face where they can easily be reached for wiring connections, and where there is no problem with interference of illumination of each diode island. Any reduction in sensitivity is compensated for by making the light brighter, or the associated circuitry more sensitive or both.

Briefly, the light-sensing system of this invention includes a body of semiconductor material having a continuous zone of one type of conductivity over one face. A plurality of isolated zones of the opposite type of conductivity are provided over the opposite face to form a plurality of discontinuous p-n junctions within the body. Means are provided for selectively irradiating the isolated junctions through the continuous zone of semiconductor material. Preferably, the isolated junctions are irradiated by shining light through a perforated tape disposed between a light source and the surface of the body with the continuous zone.

The isolated zones on the back face of the body are arranged in rows and columns to match rows and columns on the perforated tape. A common electrical connection is provided for the continuous zone on the front face of the body, and separate respective electrical connections are provided for each isolated zone on the back face of the body.

Preferably, the back face of the semiconductor body is covered with an oxide mask having separate openings over each of the isolated zones. The semiconductor body preferably is relatively thin, and therefore is mounted on a support to facilitate its handling.

These and other aspects of the invention will be more fully understood from the following detailed description and the accompanying drawings, in which.

Figure 1:
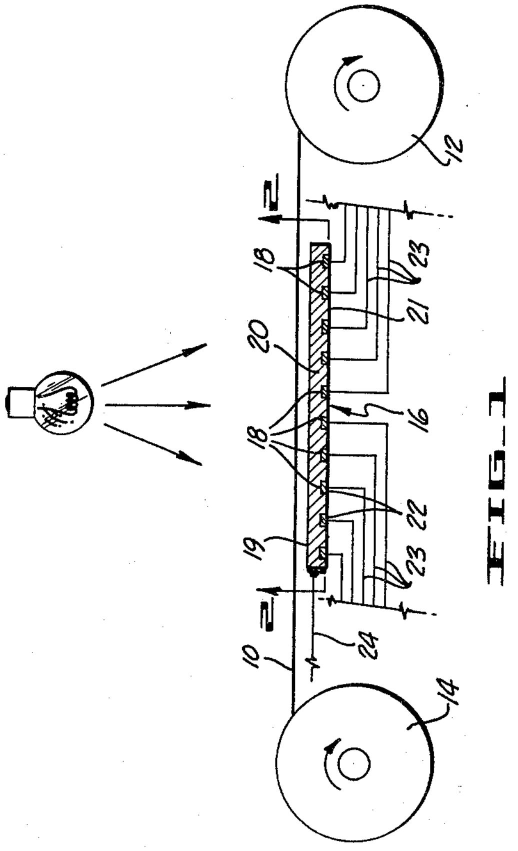
FIG. 1 is a schematic elevation showing one embodiment of the invention.

Referring to FIG. 1, a strip of punched tape 10 is pulled by a take-up reel 12 from a supply reel 14 over an array 16 of semiconductor diode p-n junctions 18. The semiconductor body 16 includes a top or front face 19 which is a part of a continuous zone 20 of semiconductor material of one type of conductivity, say the n-type. The bottom or back face 21 of the semiconductor body has a plurality of isolated zones or islands 22 of semiconductor material of the opposite conductivity type, say p-type. A separate conductor 23 is connected to each of the isolated zones, and a single common conductor 24 is connected to the continuous zone. The leads 23 and 24 are connected to suitable equipment, such as a recorder or computer to utilize the information of the punched tape. A source of light 26 is disposed above the tape to shine through perforations (not shown) and activate selected p-n junctions.

Figure 2:
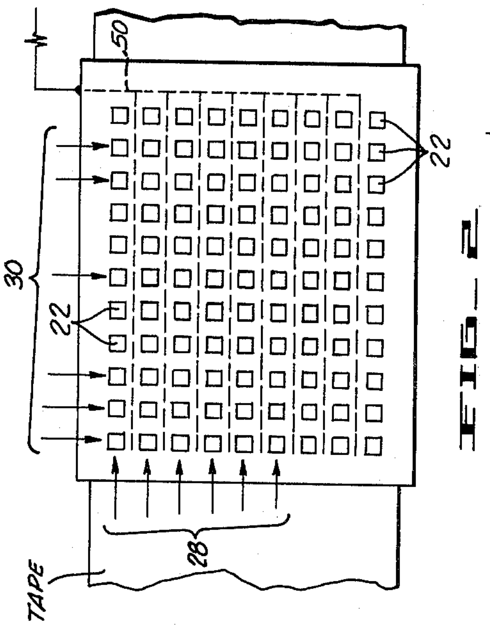
FIG. 2 is a view taken on line 2—2 in FIG. 1.

As shown best in FIG. 2, the isolated zones or islands on the back side of the semiconductor body are arranged in nine columns 28 which extend parallel to the direction of the tape movement, and eleven rows 30 which extend perpendicular to the direction of tape movement. Thus, with the system shown in FIGS. 1 and 2, the punched condition of 99 positions on the tape can be read simultaneously. Of course, the number of positions read can easily be increased by extending the length of the columns or the width of the rows of semiconductor diodes.

Figure 3:
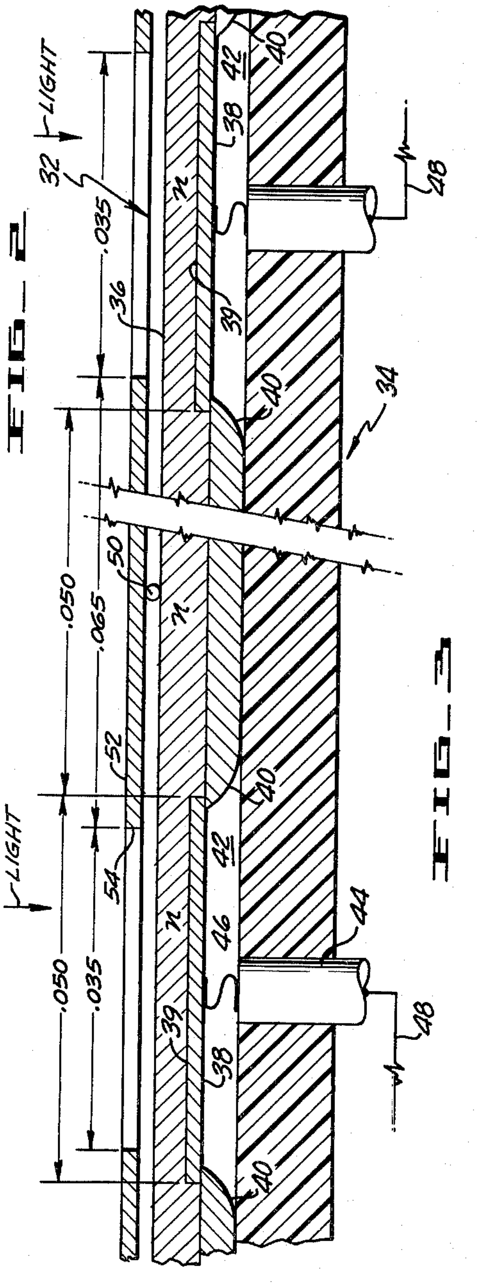
FIG. 3 is a sectional elevation of the presently preferred embodiment of the invention.

FIG. 3 shows the presently preferred embodiment of the invention in which a relatively thin sheet or body 32 of semiconductor material is mounted on a mechanical support 34. The main portion of the semiconductor body 32, including the top surface 36, is of one conductivity type, say n-type. A plurality of isolated zones or islands 38 or "p" type conductivity are formed in the bottom surface of the body to make p-n junctions 39. Although not entirely critical, the semiconductor body should be relatively thin, said about 4 mils thick, and the p-n junctions should be about three mils from the front or top surface of the body. The islands of p-type material can be square in plan as shown in FIG. 2 and may be about .050 in. on each side, with about .050 inch between adjacent edges. Preferably, the p-type isolated zones are formed by diffusing a suitable impurity such as boron, aluminum, indium, or the like into the back face of the body through a silicon oxide mask 40 which includes openings 42 overlying the isolated zones. The surfaces of the isolated zones of p-type material are prepared for electrical contact by evaporating a thin film of aluminum (not shown) on the exposed surfaces through a mask (not shown) which covers the mask 40 and has openings overlying the zones 38.

The support plate 34, preferably is of a suitable electrical insulating material, such as beryllium oxide because of its good heat conductivity, and includes a separate respective conductive post 44 extending through it for each isolated zone 38. A resilient S-shaped metallic spring 46 is disposed between the upper end of each post 44 and a respective overlying zone 38 to make good electrical contact between the respective zones and posts. The lower ends of the post 44 are connected by respective leads 48 to appropriate circuitry (not shown). If desired, the circuit may be printed directly on the support by well known printed circuit techniques. The springs 46 are sufficiently resilient so that the semiconductor body 32 can be pressed down to bring the oxide mask 40 into firm contact with the top surface of the support 34. Preferably, the oxide mask is bonded to the top surface of the support by a suitable adhesive such as epoxy resin. Thus, the semiconductor body is firmly held and mechanically supported by the support 34, and good electrical contact is assured to each isolated zone 38 through its respective spring, post, and conductor.

The electrical contact with the front surface of the semiconductor body 32 is improved by a grid of wires 50 electrically connected or evaporated onto the top surface of the semiconductor body. Preferably, the grid of wires 50 lie in the positions indicated by dotted lines in FIG. 2 so that they do not interfere with the illumination of the junctions.

A tape 52 with perforations 54 is disposed over the top or front surface of the semiconductor body and may make a sliding contact over the grid of wires 50. By way of example, if the junctions are 50 mils square, the tape perforations may be 35 mils square so that there is no possibility of light diffusing inadvertently from one tape opening to a junction underlying a different tape position.

Figure 4:
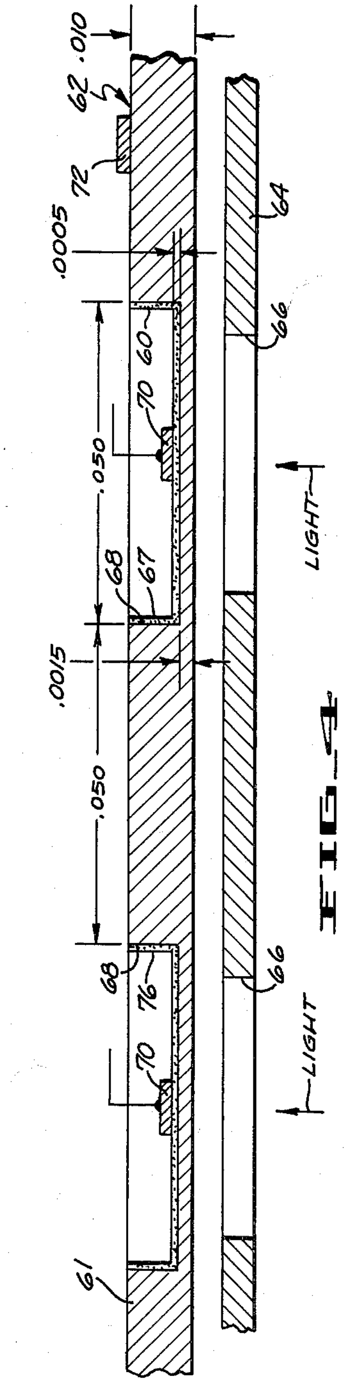
FIG. 4 is a sectional elevation of an alternate embodiment of the invention.

In the embodiment shown in FIG. 4, a plurality of recesses 60 are cut by conventional techniques in the back face 61 of a semiconductor body 62, the front face of which is disposed adjacent a tape 64 having perforations 66. The semiconductor body is of the p-type conductivity, and an n-type impurity is diffused into the recessed surfaces to form n-type conductivity zones 67 and p-n junctions 68. Although the dimensions are not entirely critical, the thickness of the semiconductor body may be about 10 mils, the depth of the recesses about 8 mils, and the recesses being squares with about 50 mils to each side and spaced 50 mils between adjacent sides. Of course, the recesses can also be circular, if desired. Suitable electrical connections 70 are provided for each isolated n-type zone, and a common connection 72 is provided for the continuous p-type zone. With the system shown in FIG. 4, light shines through perforations 66 in the tape and actuates selected p-n junctions.

Figure 5:
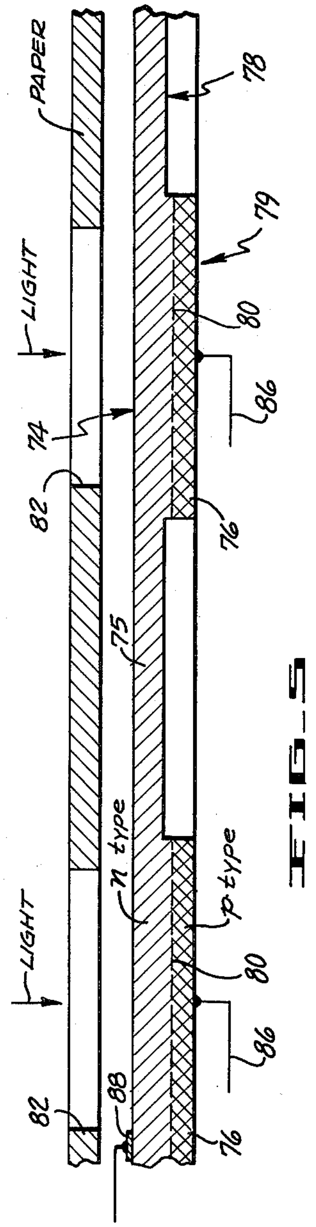
FIG. 5 is a sectional elevation of another embodiment of the invention.

With the system shown in FIG. 5, a semiconductor body 74 of n-type conductivity has diffused into its back surface isolated zones 76 of p-type conductivity. The back surface of the semiconductor body is etched at 78 to leave isolated mesas 79 with respective p-n junctions 80, which are illuminated by light shining through perforations 82 in a punched tape 84. A separate electrical connection 86 is provided for each isolated p-type zone 76, and a common connection 88 is provided for the continuous n-type zone 75.

With the array of this invention, the isolated zones are disposed on the back side of the semiconductor body so that they can easily be reached for intricate electrical connections, and so that the electrical connections do not interfere with the illumination of the isolated p-n junctions, which are illuminated from the front surface of the body through the continuous zone of semiconductor material. With the arrangement of this invention, the p-n junctions may be somewhat farther from the illuminated surface than is normal in the photovoltaic devices. However, any loss in sensitivity is easily made up by increasing the intensity of the light, the sensitivity of associated circuitry, or by using light which is strong in the red region to obtain deeper penetration.

I claim:

1. A light sensing system comprising a body of semiconductor material having a continuous zone of one type of conductivity over one face and a plurality of isolated zones of the opposite type of conductivity over an opposite face, the isolated zones being in contact with the continuous zone to form a plurality of discontinuous p-n junctions within the body, a support, the body being mounted on the support with the said opposite face adjacent the support, and means for selectively irradiating the junctions through the continuous zone, and a separate respective resilient electrically conductive spring disposed between the support and said opposite face of the body to be in contact with each isolated zone.

2. A light sensing system comprising a body of semiconductor material having a continuous zone of one type of conductivity over one face and a plurality of isolated zones of the opposite type of conductivity over an opposite face, the isolated zones being in contact with the continuous zone to form a plurality of discontinuous p-n junctions within the body, a support, the body being mounted on the support with the said opposite face adjacent the support, and means for selectively irradiating the junctions through the continuous zone, the support being of electrically insulating material having electrically conductive members extending through it, one conductive member being disposed opposite each of said isolated zones, and respective resilient electrically conductive means interconnecting the zones with respective conductive members.

3. A system as set forth in claim 2 wherein the support is provided on the surface thereof opposite the body with circuitry connected to said conductive members.

References Cited by the Examiner

UNITED STATES PATENTS

| | | | |
|---|---|---|---|
| 2,911,539 | 11/59 | Tanenbaum | 250—211 |
| 2,923,828 | 2/60 | Bernath | 250—211 |
| 2,985,805 | 5/61 | Nelson | 250—211 X |
| 2,993,998 | 7/61 | Lehovec | 250—211 |
| 3,011,089 | 11/61 | Reynolds | 250—211 X |
| 3,020,412 | 2/62 | Byczkowski | 250—211 |
| 3,046,405 | 7/62 | Emeis | 250—211 |

RALPH G. NILSON, *Primary Examiner.*

WALTER STOLWEIN, *Examiner.*